US007058837B2

(12) United States Patent
Elko et al.

(10) Patent No.: US 7,058,837 B2
(45) Date of Patent: Jun. 6, 2006

(54) METHOD AND SYSTEM FOR PROVIDING A MESSAGE-TIME-ORDERING FACILITY

(75) Inventors: David A. Elko, Austin, TX (US); Richard K. Errickson, Poughkeepsie, NY (US); Steven N. Goss, Kingston, NY (US); Dan F. Greiner, San Jose, CA (US); Carol B. Hernandez, Poughkeepsie, NY (US); Ronald M. Smith, Sr., Wappingers Falls, NY (US); David H. Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 10/435,970

(22) Filed: May 12, 2003

(65) Prior Publication Data

US 2004/0230854 A1    Nov. 18, 2004

(51) Int. Cl.
G06F 15/16    (2006.01)
G06F 1/04     (2006.01)
G06F 1/12     (2006.01)
H04J 3/06     (2006.01)
H04L 7/00     (2006.01)
H04L 7/02     (2006.01)
H04L 7/04     (2006.01)

(52) U.S. Cl. ...................... 713/375; 713/400; 713/401; 713/600; 713/601; 370/509; 370/516; 375/356; 375/362

(58) Field of Classification Search ...................... None
See application file for complete search history.

(56) References Cited

U.S. PATENT DOCUMENTS 5,317,739 A    5/1994  Elko et al.

5,463,736 A    10/1995 Elko et al.

(Continued)

OTHER PUBLICATIONS

"Synchronization of multimedia streams in distributed environments", Stoica, E.; Abdel-Wahab, H.; Maly, K.; Multimedia Comp. and Systems '97. Proc., IEEE Intn.l Conf. on Jun. 3-6, 1997 pp.: 395-402.*

(Continued)

*Primary Examiner*—James K. Trujillo
(74) *Attorney, Agent, or Firm*—Floyd A. Gonzalez; Cantor Colburn LLP (57) ABSTRACT

A method for providing a message-time-ordering facility is disclosed. The method comprises initiating the message-timer ordering facility for a message at a sender system. Initiating includes setting a delay variable to zero. The message is sent to a receiver system in response to initiating the message-time-ordering facility. Sending the message includes marking the message with a first departure time-stamp responsive to a sender system clock and transmitting the message to the receiver system. The message is received at the at the receiver system, receiving includes delaying the processing of the message until the time on a receiver system clock is greater than the first departure time-stamp and recording a time associated with the delaying the processing of the message in the delay variable. A response to the message is sent to the sender system in response to receiving the message. Sending the response includes marking the response with a second departure time-stamp responsive to the receiver system clock if the delay variable is equal to zero and transmitting the response to the sender system. The response is received at the sender system. Receiving the response includes delaying the processing of the response if the delay variable is equal to zero until the time on the sender system clock is greater than the second departure time-stamp and recording a time associated with the delaying the processing of the response in the delay variable.

20 Claims, 3 Drawing Sheets

U.S. PATENT DOCUMENTS

| | | |
|---|---|---|
| 5,590,372 A | 12/1996 | Dieffenderfer et al. |
| 5,892,765 A | 4/1999 | Shapard et al. |
| 6,081,899 A | 6/2000 | Byrd |
| 6,286,089 B1 | 9/2001 | Greiner et al. |
| 6,490,689 B1 | 12/2002 | Elko et al. |
| 6,587,985 B1 * | 7/2003 | Fukushima et al. .......... 714/748 |
| 6,647,504 B1 * | 11/2003 | Van Paepegem ............ 713/400 |
| 6,687,752 B1 * | 2/2004 | Falco et al. ................. 709/230 |
| 6,731,600 B1 * | 5/2004 | Patel et al. ................. 370/230 |
| 6,956,875 B1 * | 10/2005 | Kapadia et al. ............. 370/538 |
| 2002/0107811 A1 * | 8/2002 | Jain et al. ..................... 705/64 |
| 2002/0129290 A1 * | 9/2002 | Couillard ................... 713/400 |

OTHER PUBLICATIONS

"Distributed source-destination synchronization",Li, C.-S.; Ofek Y.; Communications, 1996. ICC 96, Conf. Record, Converging Technologies for Tomorrow's Applications. 1996 IEEE Intl.l Conf. on vol. 3, Jun. 23-27, 1996 pp.:1341-1347.*

* cited by examiner

METHOD AND SYSTEM FOR PROVIDING A MESSAGE-TIME-ORDERING FACILITY

BACKGROUND OF THE INVENTION

The present disclosure relates generally to a method and system for providing a message-time-ordering facility, and particularly to a method and system for executing messages in a PARALLEL SYSPLEX, a registered trademark of International Business Machines Corporation (hereafter IBM), environment in a correct time order even when the clocks of the participating systems are not in perfect synchronization.

Large computer systems have evolved over the years from single system uniprocessors, to tightly-coupled multiprocessors, to loosely-coupled configurations, and finally to sysplex configurations (e.g., IBM Sysplex and IBM PARALLEL SYSPLEX). A single system uniprocessor includes a single central processor complex (CPC) made up of a single central processor (CP) and all associated system hardware and software, controlled by a single copy of the operating system. Tightly coupled multiprocessors include a number of CPs added to a CPC that share central storage and a single copy of the operating system. Work is assigned to an available CP by the operating system and can be rerouted to another CP if the first CP fails. A loosely coupled configuration has multiple CPCs (which may be tightly coupled multiprocessors) with separate storage areas, managed by more than one copy of the operating system and connected by channel-to-channel communications.

A sysplex is similar to a loosely coupled configuration, but differs in that it has a standard communication mechanism (e.g., a coupling facility) for communication between application programs located on one or multiple computers. The sysplex is made up of a number of CPCs that collaborate, through specialized hardware and software, to process a work load. PARALLEL SYSPLEX environments may also include workload manger functions to manage the resources through dynamic workload balancing and prioritization according to user-defined criteria. In addition, PARALLEL SYSPLEX environments may include data-sharing capabilities that support simultaneous, multiple-system access to data. An example PARALLEL SYSPLEX environment includes two or more systems connected to a coupling facility by either intersystem-channel (ISC) links or integrated-cluster-bus (ICB) links. In addition, an external time reference (ETR) is connected to the two or more systems via ETR links.

Many PARALLEL SYSPLEX computer applications depend on the correct sequence of transactions (e.g., a stock trading application) being performed by multiple systems. The correct sequencing of transactions between systems requires that the time-of-day (TOD) clocks on the respective systems be within the signalling time (i.e., the time required for the communication between the loosely-coupled systems). Electro-mechanical variations in the systems' clocks allow them to drift apart from each other. The ETR ensures that the clocks are resynchronized at approximately once every second, but during the intervening time a clock may drift by as much as five parts per million (i.e., 5 microseconds). The drift can be caused by a variety of factors including temperature, electricity and age. Thus, the clock offset of any two systems in a PARALLEL SYSPLEX configuration may be as large as ten microseconds when the clocks are drifting in opposite directions. When PARALLEL SYSPLEX was first introduced in the early 1990s, the signalling time needed to communicate a message through the coupling facility was significantly greater than the maximum-possible clock offset, thus the synchronization requirements described above were met.

Since the introduction of the PARALLEL SYSPLEX, the speed of the processors upon which the coupling facility and its attaching systems run has steadily increased, as has the speed of the ISC and ICB communication links. However, the precision of the ETR has not changed, and a clock drift of several microseconds between re-synchronization is still possible. As the processor speeds continue to increase, the signaling time will eventually be less than the maximum-allowable clock offset and the requirements for clock synchronization will no longer be met by re-synchronizing the clocks once every second as described above.

SUMMARY OF THE INVENTION

In one embodiment, a method for providing a message-time-ordering facility is disclosed. The method comprises initiating the message-time-ordering facility for a message at a sender system. Initiating includes setting a delay variable to zero. The message is sent to a receiver system in response to initiating the message-time-ordering facility. Sending the message includes marking the message with a first departure time-stamp responsive to a sender system clock and transmitting the message to the receiver system. The message is received at the receiver system, receiving includes delaying the processing of the message until the time on a receiver system clock is greater than the first departure time-stamp and recording a time associated with the delaying the processing of the message in the delay variable. A response to the message is sent to the sender system in response to receiving the message. Sending the response includes marking the response with a second departure time-stamp responsive to the receiver system clock if the delay variable is equal to zero and transmitting the response to the sender system. The response is received at the sender system. Receiving the response includes delaying the processing of the response if the delay variable is equal to zero until the time on the sender system clock is greater than the second departure time-stamp and recording a time associated with the delaying the processing of the response in the delay variable.

In another embodiment, a method for providing a message-time-ordering facility is disclosed. The method comprises initiating the message-time-ordering facility for a message at a central processing unit. Initiating includes setting a delay variable to zero. The message is sent to a coupling facility in response to initiating the message-time-ordering facility. Sending the message includes marking the message with a first departure time-stamp responsive to a central processing unit clock and transmitting the message to the coupling facility. The message is received at the coupling facility, receiving includes delaying the processing of the message until the time on a coupling facility clock is greater than the first departure time-stamp and recording a time associated with the delaying the processing of the message in the delay variable. A response to the message is sent to the central processing unit in response to receiving the message. Sending the response includes marking the response with a second departure time-stamp responsive to the coupling facility clock if the delay variable is equal to zero and transmitting the response to the central processing unit. The response is received at the central processing unit. Receiving the response includes delaying the processing of the response if the delay variable is equal to zero until the time on the central processing unit clock is greater than the second departure time-stamp and recording a time associated with the delaying the processing of the response in the delay variable.

In another embodiment, a computer program product for providing a message-time-ordering facility is disclosed. The computer program product comprises a storage medium readable by a processing circuit and storing instructions for execution by the processing circuit for performing a method. The method comprises initiating the message-time-ordering facility for a message at a sender system. Initiating includes setting a delay variable to zero. The message is sent to a receiver system in response to initiating the message-time-ordering facility. Sending the message includes marking the message with a first departure time-stamp responsive to a sender system clock and transmitting the message to the receiver system. The message is received at the receiver system, receiving includes delaying the processing of the message until the time on a receiver system clock is greater than the first departure time-stamp and recording a time associated with the delaying the processing of the message in the delay variable. A response to the message is sent to the sender system in response to receiving the message. Sending the response includes marking the response with a second departure time-stamp responsive to the receiver system clock if the delay variable is equal to zero and transmitting the response to the sender system. The response is received at the sender system. Receiving the response includes delaying the processing of the response if the delay variable is equal to zero until the time on the sender system clock is greater than the second departure time-stamp and recording a time associated with the delaying the processing of the response in the delay variable.

In a further embodiment, a system for providing a message-time-ordering facility is disclosed. The system comprises a receiver system including a receiver system clock and a sender system including a sender system clock. The sender system is in communication with the receiver system. The sender system and the receiver system include instructions to implement a method comprising initiating the message-time-ordering facility for a message at the sender system. Initiating includes setting a delay variable to zero. The message is sent to the receiver system in response to the initiating. Sending the message includes marking the message with a first departure time-stamp responsive to the sender system clock and transmitting the message to the receiver system. The message is received at the receiver system, receiving includes delaying the processing of the message until the time on the receiver system clock is greater than the first departure time-stamp and recording a time associated with the delaying the processing of the message in the delay variable. A response to the message is sent to the sender system in response to receiving the message. Sending the response includes marking the response with a second departure time-stamp responsive to the receiver system clock if the delay variable is equal to zero and transmitting the response to the sender system. The response is received at the sender system. Receiving the response includes delaying the processing of the response if the delay variable is equal to zero until the time on the sender system clock is greater than the second departure time-stamp and recording a time associated with the delaying the processing of the response in the delay variable.

BRIEF DESCRIPTION OF THE DRAWINGS

Referring to the exemplary drawings wherein like elements are numbered alike in the accompanying Figures.

DETAILED DESCRIPTION OF THE INVENTION

With ever-increasing processor and channel speeds, the existing external time reference (ETR) hardware can no longer ensure that the synchronization of attaching systems' clocks are within the signaling time of a PARALLEL SYSPLEX message. A means of circumventing the potential for out-of-order message execution within the sysplex is provided by a message-time-ordering facility disclosed in an exemplary embodiment of the present invention. The message-time-ordering facility can be phased in to a PARALLEL SYSPLEX configuration one system at a time and it does not require bringing down the entire sysplex to be activated. In an exemplary embodiment of the present invention, the message-time-ordering facility provides a means by which messages and responses exchanged between an attaching system and the receiver system appear to be in the correct time sequence, even if the clocks of the respective systems differ by more than the intersystem signalling time. The appearance of correct time ordering is achieved by a detection and correction algorithm described below.

Figure 1:
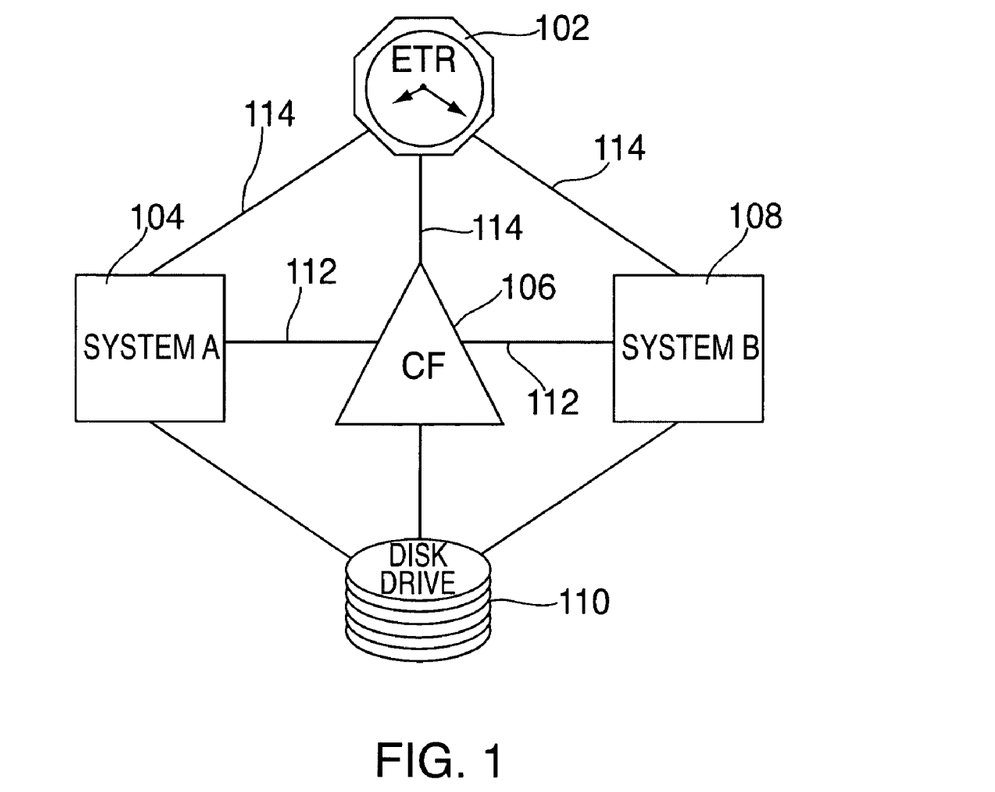
FIG. 1 is a block diagram of an exemplary system for providing a message-time-ordering facility.

FIG. 1 is a block diagram of an exemplary PARALLEL SYSPLEX system for providing a message-time-ordering facility. System A 104 and system B 108 are connected to a coupling facility (CF) 106 by a link 112 such as an inter-system-channel (ISC) link or an integrated-cluster-bus (ICB) link. In a PARALLEL SYSPLEX environment, a CF provides a highly structured means of connecting multiple central processor complexes (CPCs). This allows for the efficient interchange of data between multiple physical and logical systems in a PARALLEL SYSPLEX environment, while maintaining coherency of the data across all systems. Also depicted in FIG. 1 is an external time reference (ETR) 102 connected to system A 104, system B 108 and the ETR 102 via ETR links 114. The ETR 102 provides a means by which the time-of-day (TOD) clocks on system A 104 and system B 108 may be synchronized. This synchronization is important in a PARALLEL SYSPLEX environment, as described below. FIG. 1 also includes a disk drive 110 to store application data (e.g., account balances, medical records) that may be shared by system A 104 and system B 108. In FIG. 1, two central processing units are depicted (i.e., system A 104 and system B 108), however any number of central processing units may be supported by an embodiment of the present invention.

The synchronization requirements for systems in a PARALLEL SYSPLEX environment can be summarized as follows: when system A 104 issues a STORE CLOCK (STCK) instruction, system A 104 then signals system B 108; and upon receipt of the signal, system B 108 immediately issues a STCK instruction. Referring to FIG. 1, an exemplary embodiment of the present invention includes having the CF 106 connected to the ETR 102 in order to synchronize a CF 106 clock with the clocks on system A 104 and system B 108. As shown in FIG. 1, the CF 106 is connected to the same ETR 102 network as the attaching systems (i.e., system A 104 and system B 108). In an exemplary embodiment of the present invention, the message-time-ordering facility computer instructions are located on the sending and receiving ends of the channel connecting an attaching system and a CF. Referring to FIG. 1, message-time-ordering facility instructions are located on system A 104, system B 108 and the CF 106. For ease in implementation, the instructions may be packaged so that they may be added to an existing system without requiring re-programming (e.g., on an input/output card that drives a device), or alternatively, the instructions may be implemented in a higher programming language located on the attaching system.

In an exemplary embodiment of the present invention, messages are round-trip messages. For example, if System A 104 sends a message to the CF 106, System A 104 will receive a response back from the CF 106. In the following detection and correction discussion, the following terms are used: "sender" refers to the attaching system (i.e., system A 104 or system B 108 in the embodiment depicted in FIG. 1); "receiver" refers to the coupling facility (i.e., the CF 106 in FIG. 1); "departure time" refers to either the sender's TOD clock when a message is sent, or the receiver's TOD clock when a response is sent; and "arrival time" refers to either the receiver's TOD clock when a message arrives, or the sender's TOD clock when a response arrives.

In addition, an exemplary embodiment of the present invention is not limited to sending and receiving messages in a coupling facility environment. In an alternate embodiment of the present invention, messages are unidirectional messages. An embodiment of the present invention may be utilized in any variety of interprocessor communication (IPC) environments, where messages may be one-way.

In an exemplary embodiment of the present invention, the message-time-ordering facility detection process applies to primary messages, that is, messages that are initiated by sender channels. Secondary messages that are initiated by the CF (106) are not subject to message-time-ordering-facility detection and correction. In an exemplary embodiment of the present invention, the sender controls the enablement of the message-time-ordering facility. The control is on a per-message basis and therefore individual message that do not require time ordering (e.g., control messages, initialization messages) need not be processed by the message-time-ordering facility. In addition, when a message-time-ordering facility message is transmitted from a sender to a receiver and the message's departure time is less than its arrival time, then the message is processed by the receiver without adjustment by the message-time-ordering facility. When the message's departure time is greater than or equal to its arrival time, then the message-time-ordering facility will attempt to ensure correct time ordering, as described below in reference to FIG. 2. Finally, when a response to a message-time-ordering facility is transmitted from the receiver to the sender and the response's departure time is less than its arrival time, then the response is processed by the sender without adjustment by the message-time-ordering facility. When the response's departure time is greater than or equal to the arrival time, then the message-time-ordering facility will attempt to ensure correct time ordering, as described below in reference to FIG. 2.

Figure 2:
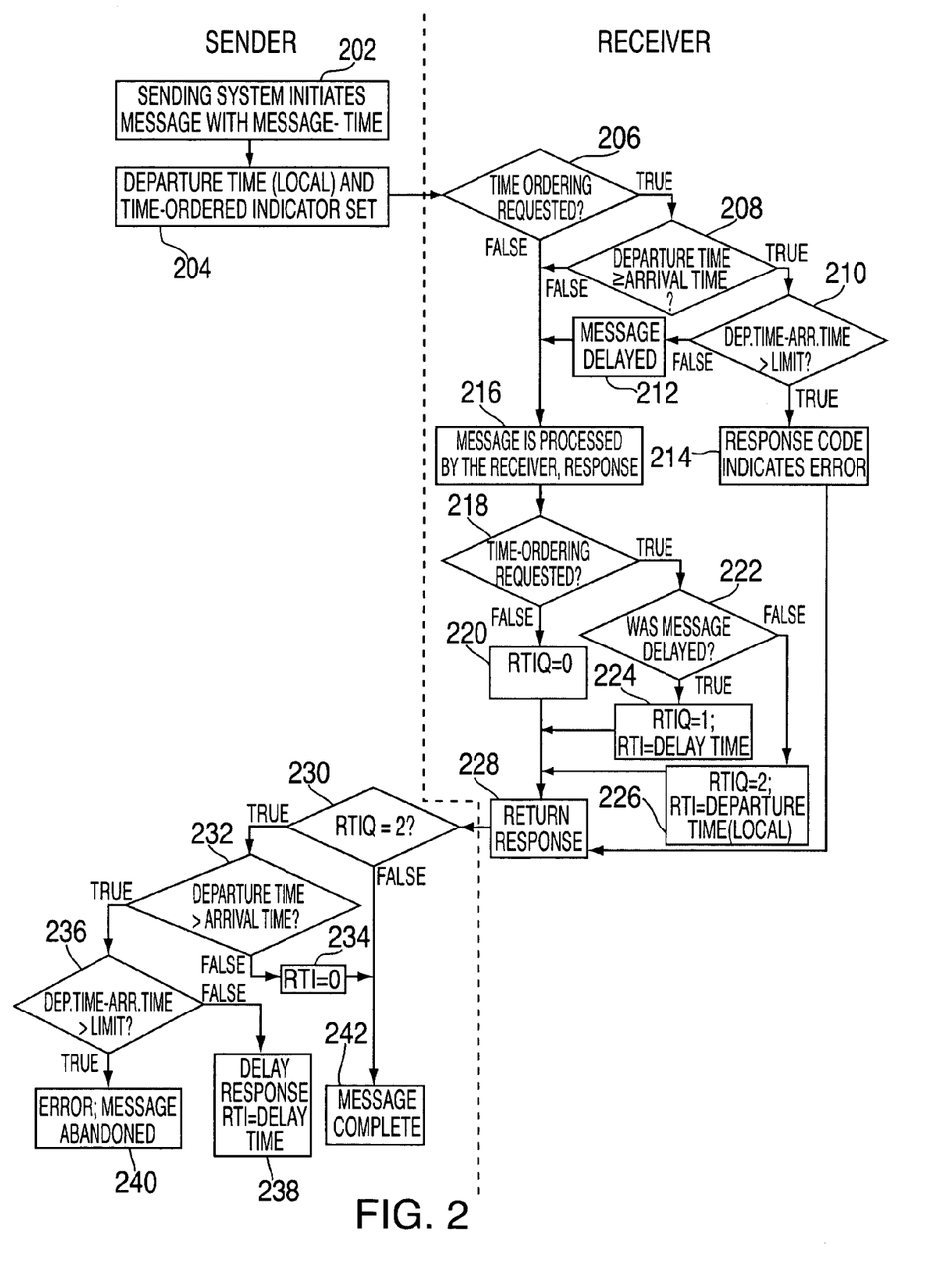
FIG. 2 is a block diagram of a process flow for providing a message-time-ordering facility using an exemplary embodiment of the present invention.

FIG. 2 is a block diagram of a high-level process flow for providing a message-time-ordering facility using an exemplary embodiment of the present invention. Regardless of whether a message or response is being transmitted, when the departure time of the message or response is greater than the arrival time the message-time-ordering facility attempts to delay the processing of the message or response. At step 202, a sending system (e.g., system A 104, system B 108) enables the message-time-ordering facility for a message. At step 204, the message is sent by the sending system and is time-stamped with a departure time corresponding to the time on the sending system clock.

At step 206, the message arrives at the receiver(e.g., CF 106) and a determination is made as to whether the message is subject to time ordering; if not, the message is processed normally at step 216. If the message is subject to time ordering, a check is made at step 208 to determine if the message's departure time at the sender is greater than or equal to its arrival time at the receiver by comparing the departure time-stamp of the message with the receiver's (e.g., CF 106) clock at the time of arrival. If it is determined at step 208 that the message's departure time is greater than or equal to its arrival time, and if it is determined at step 210 that the difference between the sender's clock and the receiver's clock does not exceed a model-dependent limit, then processing continues with step 212. If it is determined at step 208 that the message's departure time is less-than its arrival time, then time-ordering is correct, and processing continues with step 216. At step 212, the receiver hold the message until the receiver's clock is greater than the message's departure time. If step 210 determines that the difference between the message's departure time and its arrival time exceeds a model-dependent limit, then the systems' time-of-day clocks are considered to be sufficiently out of synchronization to preclude successful recovery by the message-time-ordering facility, and an error condition is recognized at step 214, and a response indicating the error condition is returned at step 228.

Step 216 represents the processing of the message, which, in an exemplary embodiment of the invention, involves executing a command at a coupling facility and formulating a response block. Step 218 determines if message-time ordering was requested, and if not, step 220 sets the response-time-indication qualifier (RTIQ) to zero, indicating that no message-time-ordering occurred at the receiver. If step 218 determines that time ordering was requested, then step 222 determines whether the message was actually delayed by the receiver (at step 212). If the message was delayed by the receiver, then step 224 sets the RTIQ to 1 to indicate the delay and sets the response-time indication (RTI) to contain the elapsed time that the message was delayed at the receiver. If step 222 determines that the message was not delayed, then step 226 sets the RTIQ to 2 and sets the RTI to the time-stamp corresponding to the receiver's system clock. The response block, formulated in step 216 and qualified in steps 220, 224, or 226; or the error response code that was set in step 214 is returned to the sender at step 228.

Step 230 represents the response's arrival at the sender. The sender determines if the RTIQ contains a value of 2. If the RTIQ does not contain a value of, 2 then the message is complete, as shown at step 242. If the RTIQ does contain a value of 2, then step 232 determines if the response's departure time at the receiver is greater than or equal to the arrival time at the sender by comparing the departure time-stamp of the response with the sender's (system A 104 or system B 108) clock at the time of arrival. If the response's departure time is less than the arrival time at the sender, then step 234 replaces the RTI with a value of zero, indicating no delay was caused by the message-time-ordering facility, and the message is completed at step 242. If the departure time of the response is greater than or equal to the arrival time at the sender, then step 236 determines if the difference between the departure time and arrival time exceeds a model-dependent limit. If so, then the sender and receiver's clocks are sufficiently out of synchronization so as to preclude successful correction by the message-time-ordering facility, and step 240 recognizes an error condition and abandons the message. If step 236 determines that the difference between the departure time and arrival time does not exceed a model-dependent limit, then step 238 delays the delivery of the response to the sender until the sender's clock is greater than the time-stamp in the RTI field; then the RTI field is replaced with the elapsed time that the response was delayed, and the message is completed in step 242.

The delaying technique described in reference to FIG. 2 is effective so long as the TOD values are not grossly out of synchronization. If messages or responses were delayed too long, performance degradation would quickly become evident. Therefore, if the arrival and departure times differ by more than a model-dependent value, then the systems are considered to be sufficiently out of synchronization to preclude successful correction by the message-time-ordering facility. In this case, an error condition is recognized.

Detailed Implementation

The following paragraphs describe the detailed implementation and operation of the message-time-ordering facility in an exemplary embodiment of the present invention.

Determining the availability of the message-time-ordering facility. When the message-time-ordering facility is installed in a configuration, the channel commands may include a command to determine the availability of the message-time-ordering facility in the issuing system. Note, it does not necessarily follow that the message-time-ordering facility is also available in other systems to which the issuing system is attached. Alternatively, the CF 106 may determine the availability of the message-time-ordering facility by detecting the presence of an ETR 102. When an ETR 102 is available to the CF 106, the message-time-ordering facility is implicitly present. An attaching system determines whether the CF 106 can support the message-time-ordering facility by issuing the read-facility-parameters (RFP) command to the CF 106; the response to the RFP command includes objects describing various attributes and characteristics of the CF 106. When the message-time-ordering facility is available to the CF 106 and coupling-facility-control-code (CFCC) supports its use, the response to the RFP command includes: a flag indicating that the message-time-ordering facility is available; a flag indicating that the speed of the CF 106 processor is sufficiently fast that message-time ordering is required to ensure data integrity; and the network identification of the ETR 102 to which the coupling facility is attached, this is used by the attaching system to ensure that it is connected to the same ETR 102 network as the CF 106. In an exemplary embodiment of the present invention, the CF 106 determines whether an attaching system can support the message-time-ordering facility when it receives a message with a new message-time-ordering (MTO) flag set in the message header.

Attachment of an ETR 102 to the CF 106. For the message-time-ordering facility to function properly, the CF 106 must have access to the same external-time-reference network as all other attaching systems in the sysplex. If the CF 106 runs in a logical partition (LPAR) along with other attaching logical systems in the same physical system, then no additional ETR 102 attachment is required. However, if a standalone CF 106 is used, then additional ETR 102 ports and links must be provided for the CF 106.

Initiation of a time-ordered message at the sender. See FIG. 3, for structures and high level fields utilized to initialize a time-ordered message at the sender. In order to send a message to a CF 106, the sender initializes: a message-command block (MCB) 306 containing specific details about the request and a message-operation block (MOB) 304 which contains the addresses of the MCB 306 and MBAL, as well as other controls for the message operation. The sender then issues the SEND MESSAGE (SMSG) instruction 302, an operand of which contains the address of the MOB 304. When both the attaching system (sender) and the CF 106 (receiver) support the message-time-ordering facility, the sender can request that selected messages be subject to time ordering. To indicate that a request is to be subject to message time ordering, the sender sets a new time-ordering (T) flag field 308 in the message-operation block. Note, that not all messages require time ordering. For example, messages sent to the coupling facility that do not have visible results on other attaching systems do not need to exploit the message-time-ordering facility.

Figure 3:
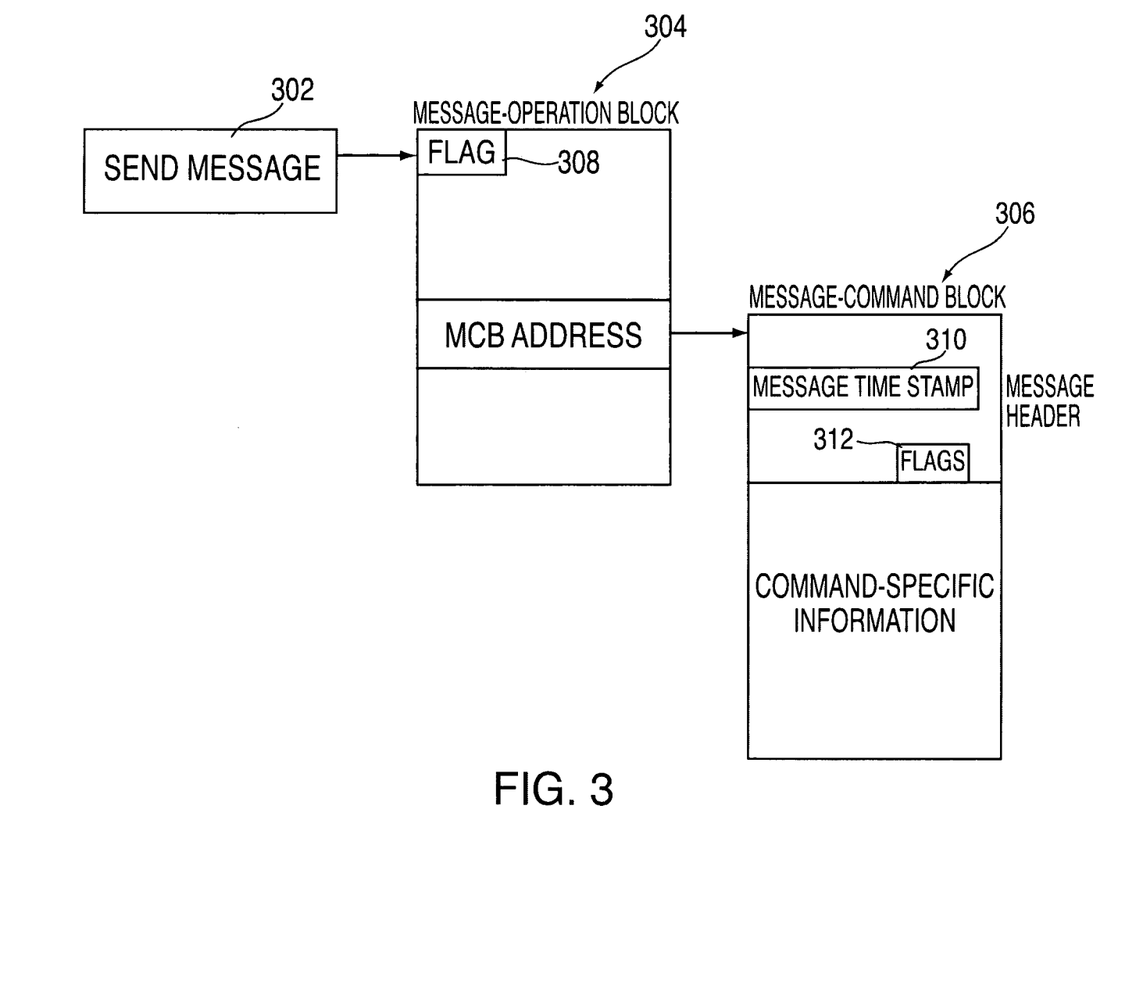
FIG. 3 is a block diagram of structures and fields utilized to initialize a time-ordered message at the sending location.

When the SEND MESSAGE instruction 302 is executed and the time-ordering bit is on in the MOB 304, the SMSG instruction 302 causes two new fields to be set in the message-header section (the first four words) of the MCB 306: a message-time-ordering flag is set in the flag field 312 of the message header, indicating to the CF 106 that the request is to be subjected to time ordering; and selected bits of the sender's TOD clock are placed in a new message-timestamp field 310 in the message header, indicating the time that the message was issued by the sender (i.e., the message's departure time). In an exemplary embodiment of the present invention, the message-time-ordering facility uses bits thirty-two to fifty-five of the TOD clock, providing a precision of one-sixteenth (0.0625) of a microsecond.

Arrival of a time-ordered message at the receiver. CFCC issues the LOCATE CHANNEL BUFFER (LCB) instruction to identify any new messages that have arrived in its channel buffers. When a message is pending at the channel buffer, LCB returns a token representing the channel buffer containing the message. When no messages are pending, LCB returns a token of zeros. When a message arrives in which the message-time-ordering flag is set in the flag field 312 of the message header, the LCB instruction determines the arrival time of the message based on selected bits of the receiver's TOD clock. If the departure time in the message-time-stamp field 310 of the message header is less than the corresponding bits of the arrival timestamp, then no additional message-time-ordering facility intervention is required; LCB returns the token of the channel buffer, and the message is processed normally.

However, if the departure time is greater than or equal to the arrival time, it indicates that the sender's clock is ahead of the receiver's clock, and the message must be delayed before processing. In this case, LCB does not return a token for this message. Instead, the arrival time of the message is preserved in the channel buffer for later calculation. This occurs only once for each message, and is not repeated on subsequent LCBs for the same message. Next, if the difference between the message's departure time and the arrival time is greater than a model-dependent value, then the TOD clocks of the sender and receiver are considered to be sufficiently out of synchronization so as to preclude successful correction by the message-time-ordering facility. MTOF is designed to correct for small time differences. (E.g., around 5–10 microseconds). If the two systems' clocks differ by more than one millisecond, than the clocks are considered to be grossly out of synchronization. In the case where the clocks are grossly out of synchronization, a response is immediately returned to the sender indicating a request exception with a new time-ordering-exception status condition. LCB returns a token of zeros, and the message is discarded. Finally, if the difference between the departure time and the arrival time is less than or equal to the model-dependent value, then the message is kept pending in the channel buffer. So long as the message's departure time remains greater than or equal to the corresponding bits of the receiver's TOD clock, LCB may return a token of zeros, or it may attempt to find pending work in other channel buffers. When a subsequent LCB is issued and the departure time of the message is less than the corresponding bits in the receiver's TOD clock, then: the difference between the receiver's TOD clock and the arrival time value is computed, this difference represents the time that the message was delayed by the message-time-ordering facility, and it is preserved for response processing, as described below; and the token for the message is returned by LCB for CFCC processing.

Responding to a time-ordered message at the receiver. After processing a message, the receiver responds by building a message-response block (MRB) and issuing the SIGNAL CHANNEL BUFFER (SCB) instruction. The first four words of the MRB contain a response descriptor containing the length of the response and other various indications. The message-time-ordering facility defines two additional fields in the response descriptor, as follows: the response-time-indication (RTI) field, and the response-time-indication qualifier (RTIQ) field. The RTI field provides either an indication of how long the message was delayed by the receiver, or a timestamp indicating the response's departure time. The RTI and RTIQ fields are set by the SCB instruction when the message response is sent, as follows:

| RTIQ Value | RTIQ Meaning | RTI Contents |
| --- | --- | --- |
| 0 | Either time ordering was not requested in the message header, or the receiver does not support the message-time-ordering facility. | Zeros |
| 1 | The message was delayed by the receiver (i.e., LCB). | The time that the message was delayed by the receiver. |
| 2 | The message was not delayed by the receiver. | The departure timestamp when the response was sent. |

Arrival of a time-ordered response at the sender. Completion of a message at the sender is indicated by the sender's subchannel becoming idle. At this time, all data transfer associated with the message has finished, and the message response has been received in a message-response block (MRB). When the message-time-ordering facility is installed at the sender and time-ordering has been requested for the message, additional steps may occur prior to the completion of the message. When the RTIQ field in the response descriptor of the MRB is zero, then either the sender did not request time ordering, or the receiver did not support it. In this case, the send function completes with no further message-time-ordering facility intervention. Assuming that the sender has determined that the receiver supports message-time-ordering facility and has requested time ordering, a RTIQ of zero represents an abnormal situation. If time ordering is requested and the receiver supports it, an RTIQ of one or two is the only expected value.

When the RTIQ field is one, then the message was delayed by the receiver prior to processing and the RTI field contains the time that the message was delayed. In this case, the send function completes with no further message-time-ordering facility intervention. Performance-analysis programs in the sender may use the RTI field for measuring the message-time-ordering facility receiver-induced delays.

When the RTIQ field is two, the message was not delayed at the sender. In this case, the RTI field contains the response's departure time. If the response's departure time is less than its arrival time at the sender, then the RTI field is replaced with zero, and the send function completes with no further message-time-ordering facility intervention. If, however, the response's departure time is greater than or equal to the arrival time at the sender, then if the difference between the response's departure time and its arrival time exceeds a model-dependent value, then the sender and receiver clocks are considered to be sufficiently out of synchronization to preclude successful correction by message-time-ordering facility. In this case, a time-ordering-check status condition is indicated in the subchannel status word, and the send function terminates with status pending. Alternatively, if the difference between the response's departure time and its arrival time does not exceed a model-dependent value, then the arrival time is preserved for subsequent computation, and the response is delayed. When the sender's clock becomes greater than the response's departure time, then the RTI field is replaced with the difference between the sender's current TOD and the response arrival time, and the send function ends by placing the subchannel in the idle state. When the RTIQ field contains two and the send function completes, then performance-analysis programs may use the RTI filed for measuring message-time-ordering facility sender-induced delays.

The detection/correction algorithm, described herein, can easily be adapted to other network environments (e.g., UNIX, LINUX). The software device drivers for IPC functions may be adapted to perform the detection and correction functions described herein, providing the means for message time ordering in such environments. Synchronization between the networked systems can be maintained via the Network Time Protocol (NTP), an Internet timing standard, rather than the ETR shown in the exemplary embodiment.

An exemplary embodiment of the present invention, a message-time-ordering facility, provides a relatively low-cost, highly effective solution to the problem of adjusting for clocks that differ by more than the intersystem signaling time. Given adequate resources in the configuration, migration to the message-time-ordering facility is nondisruptive to the PARALLEL SYSPLEX. Individual attaching systems and coupling facilities will need to have new firmware and software loaded, but the sysplex can continue to operate during the migration process. In addition, older sender and receiver systems that neither require nor support the message-time-ordering facility can coexist with newer systems that do support the message-time-ordering facility. The ability to enable or disable the message-time-ordering facility on a per-message basis provides allows for no delay to be applied to messages if their results are not visible to other systems. In addition, the ability to perform detection and correction for both messages and responses can lead to more accurate synchronization results. The model-dependent threshold restricts correction when TOD clocks are grossly out of synchronization and notifies the CF 106 when the message-time-ordering facility cannot be applied indicating a larger synchronization issue. Performance-measurement data is provided to the sender when correction occurs, the data distinguishes both sender and receiver corrections and may be utilized for performance and trend analysis. An embodiment of the message-time ordering facility may be applied to communication networks other than in a PARALLEL SYSPLEX environment.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing a message-time-ordering facility, the method comprising:
    initiating said message-time-ordering facility for a message at a sender system, wherein said initiating includes setting a delay variable to zero;
    sending said message to a receiver system in response to said initiating, wherein said sending includes:
    marking said message with a first departure time-stamp responsive to a sender system clock; and
    transmitting said message to said receiver system;
    receiving said message at said receiver system including delaying the processing of said message until the time on a receiver system clock is greater than said first departure time-stamp and recording a time associated with said delaying the processing of said message in said delay variable;
    sending a response to said message to said sender system in response to
    said receiving said message including:
        marking said response with a second departure time-stamp responsive to said receiver system clock if said delay variable is equal to zero; and
        transmitting said response to said sender system; and
    receiving said response at said sender system including delaying the processing of said response if said delay variable is equal to zero until the time on said sender system clock is greater than said second departure time-stamp and recording a time associated with said delaying the processing of said response in said delay variable.

2. The method of claim 1 wherein said sender system clock and said receiver system clock are not synchronized with each other.

3. The method of claim 1 wherein said delay variable is zero in response to said receiving said response at said sender system.

4. The method of claim 1 further comprising:
    comparing said delay variable to a preselected threshold; and
    transmitting an error message in response to said delay variable exceeding said preselected threshold.

5. The method of claim 4 wherein said preselected threshold is one millisecond.

6. The method of claim 1 wherein said delaying the processing of said message includes:
    holding said message until said time on said receiver system clock is greater than said first departure time-stamp; and
    releasing said message for processing by the receiver system in response to said time on said receiver system clock being greater than said first departure time-stamp.

7. The method of claim 1 wherein said delaying the processing of said response includes:
    holding said response until said time on said sender system clock is greater than said second departure time-stamp; and
    releasing said response for processing by the sender system in response to said time on said sender system clock being greater than said second departure time-stamp.

8. The method of claim 1 wherein if said delay variable is greater than zero then said delay variable includes a flag to indicate if said delay was caused by said receiving said message or by said receiving said response.

9. A method for providing a message-time-ordering facility, the method comprising:
    initiating said message-time-ordering facility for a message at a central processing unit, wherein said initiating includes setting a delay variable to zero;
    sending said message to a coupling facility in response to said initiating, wherein said sending includes:
        marking said message with a first departure time-stamp responsive to a central processing unit clock; and
        transmitting said message to said coupling facility;
        receiving said message at said coupling facility including delaying the processing of said message until the time on a coupling facility clock is greater than said first departure time-stamp and recording a time associated with said delaying the processing of said message in said delay variable;
    sending a response to said message to said central processing unit in response to said receiving including:
        marking said response with a second departure time-stamp responsive to said coupling facility clock if said delay variable is equal to zero; and
        transmitting said response to said central processing unit; and
    receiving said response at said central processing unit including delaying the processing of said response if said delay variable is equal to zero until the time on said central processing unit clock is greater than said second departure time-stamp and recording a time associated with said delaying the processing of said response in said delay variable.

10. A computer program product for providing a message-time-ordering facility, the computer program product comprising:
a storage medium readable by a processing circuit and storing instructions for execution by the processing circuit for performing a method comprising:
initiating said message-time-ordering facility for a message at a sender system, wherein said initiating includes setting a delay variable to zero;
sending said message to a receiver system in response to said initiating, wherein said sending includes:
marking said message with a first departure time-stamp responsive to a sender system clock; and
transmitting said message to said receiver system;
receiving said message at said receiver system including delaying the processing of said message until the time on a receiver system clock is greater than said first departure time-stamp and recording a time associated with said delaying the processing of said message in said delay variable;
sending a response to said message to said sender system in response to said receiving including:
marking said response with a second departure time-stamp responsive to said receiver system clock if said delay variable is equal to zero; and
transmitting said response to said sender system; and
receiving said response at said sender system including delaying the processing of said response if said delay variable is equal to zero until the time on said sender system clock is greater than said second departure time-stamp and recording a time associated with said delaying the processing of said response in said delay variable.

11. A system for providing a message-time-ordering facility, the system comprising:
a receiver system including a receiver system clock; and
a sender system, including a sender system clock, in communication with said receiver system, wherein said sender system and said receiver system include instructions to implement a method comprising:
initiating said message-time-ordering facility for a message at said sender system, wherein said initiating includes setting a delay variable to zero;
sending said message to said receiver system in response to said initiating, wherein said sending includes:
marking said message with a first departure time-stamp responsive to said sender system clock; and
transmitting said message to said receiver system;
receiving said message at said receiver system including delaying the processing of said message until the time on said receiver system clock is greater than said first departure time-stamp and recording a time associated with said delaying the processing of said message in said delay variable;
sending a response to said message to said sender system in response to said receiving including:
marking said response with a second departure time-stamp responsive to said receiver system clock if said delay variable is equal to zero; and
transmitting said response to said sender system; and
receiving said response at said sender system including delaying the processing of said response if said delay variable is equal to zero until the time on said sender clock is greater than said second departure time-stamp and recording a time associated with said delaying the processing of said response in said delay variable.

12. The system of claim 11 further comprising an external time reference in communication with said receiver system and said sender system, wherein said receiver system clock and said sender system clock are synchronized with said external time reference on a preselected periodic basis.

13. The system of claim 12 wherein said preselected periodic basis is approximately one second.

14. The system of claim 12 wherein said external time reference receives time data from an atomic clock.

15. The system of claim 11 wherein said communication is channel to channel communication.

16. The system of claim 11 further comprising inter-system-channel links and wherein said communication is via said links.

17. The system of claim 11 further comprising integrated-cluster-bus links and wherein said communication is via said links.

18. The system of claim 11 wherein said instructions are located on an input/output card included in said sender system and said receiver system.

19. The system of claim 11 wherein said sender system includes a multiple virtual storage (MVS) operating system.

20. The system of claim 11 wherein said sender system includes a virtual machine (VM) operating system.

* * * * *